(12) United States Patent
Badillo Gutierrez et al.

(10) Patent No.: US 10,195,983 B2
(45) Date of Patent: Feb. 5, 2019

(54) MOTOR VEHICLE JACK POSITIONING SYSTEM AND METHOD

(71) Applicant: FORD GLOBAL TECHNOLOGIES, LLC, Dearborn, MI (US)

(72) Inventors: Jose Abinadi Badillo Gutierrez, Cuautitlan Izcalli (MX); Pedro Garcia Zarco, Mexico City (MX); Victor Negrete Cortes, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 79 days.

(21) Appl. No.: 15/257,450

(22) Filed: Sep. 6, 2016

(65) Prior Publication Data

US 2018/0065543 A1    Mar. 8, 2018

(51) Int. Cl.
*B60Q 1/32* (2006.01)
*B60Q 1/00* (2006.01)
*B60C 23/00* (2006.01)
*B60Q 1/24* (2006.01)

(52) U.S. Cl.
CPC ........... *B60Q 1/32* (2013.01); *B60C 23/00* (2013.01); *B60Q 1/0076* (2013.01); *B60Q 1/24* (2013.01); *B60Q 1/326* (2013.01)

(58) Field of Classification Search
CPC ........ B60Q 1/32; B60Q 1/0076; B60Q 1/085; B60Q 1/10; B60Q 1/12; B60Q 1/1423; B60Q 3/06; B60Q 1/00; B60Q 9/00; B60Q 2300/00; B60Q 2300/10; B60Q 2300/45; B60Q 11/00; F21V 23/0442; G01R 31/00
See application file for complete search history.

(56) References Cited

U.S. PATENT DOCUMENTS

| | | | | |
|---|---|---|---|---|
| 2,557,872 A | * | 6/1951 | Holland | B60Q 1/2692 362/506 |
| 4,042,816 A | * | 8/1977 | Smoot | B60Q 9/003 340/437 |
| 4,802,069 A | | 1/1989 | Chandler | |
| 5,558,426 A | * | 9/1996 | Cabanatan | B60Q 1/2657 362/249.01 |
| 6,332,700 B1 | * | 12/2001 | Baines | B60Q 1/326 362/362 |
| 6,416,209 B1 | * | 7/2002 | Abbott | B60Q 1/323 362/327 |
| 6,422,725 B1 | * | 7/2002 | Fong | B60Q 1/24 362/287 |

(Continued)

FOREIGN PATENT DOCUMENTS

| | | |
|---|---|---|
| GB | 2149180 A | 6/1985 |
| JP | 5806368 B1 | 11/2015 |
| KR | 100208819 B1 | 7/1999 |

OTHER PUBLICATIONS

English Machine Translation of JP5806368B1.
English Machine Translation of KR100208819B1.

*Primary Examiner* — Joseph L Williams
*Assistant Examiner* — Jose M Diaz
(74) *Attorney, Agent, or Firm* — Jason Rogers; King & Schickli, PLLC

(57) ABSTRACT

A motor vehicle jack positioning system includes a light source located adjacent a jack point for the motor vehicle and a controller configured to activate the light source in response to a data signal representative of a triggering event.

13 Claims, 3 Drawing Sheets

(56) References Cited

U.S. PATENT DOCUMENTS

| | | | |
|---|---|---|---|
| 6,910,788 B2 * | 6/2005 | Jones | B60Q 1/326 |
| | | | 362/240 |
| 6,945,679 B2 * | 9/2005 | Young | B60Q 1/326 |
| | | | 362/322 |
| 7,159,849 B2 | 1/2007 | Raynor | |
| 7,220,031 B1 * | 5/2007 | Lowman | B60Q 1/2657 |
| | | | 362/35 |
| 9,205,710 B2 | 12/2015 | Patel et al. | |
| 9,586,527 B1 * | 3/2017 | Salter | B60R 3/02 |
| 2005/0258409 A1 * | 11/2005 | Raynor | B60S 11/00 |
| | | | 254/126 |
| 2008/0137338 A1 * | 6/2008 | Lin | A47G 19/2227 |
| | | | 362/253 |
| 2014/0217342 A1 | 8/2014 | Dondurur et al. | |
| 2015/0350750 A1 * | 12/2015 | Yun | H04Q 9/00 |
| | | | 340/870.07 |
| 2017/0274712 A1 * | 9/2017 | Salter | F21K 9/64 |

* cited by examiner

MOTOR VEHICLE JACK POSITIONING SYSTEM AND METHOD

TECHNICAL FIELD

This document relates generally to the motor vehicle equipment field and, more particularly, to a motor vehicle jack positioning system as well as to a method of positioning a motor vehicle jack with respect to a motor vehicle.

BACKGROUND

Wherever and whenever an individual travels in a motor vehicle there is the risk of incurring a flat tire. Thus, it is possible that an individual may become stranded on the roadway, left with a single alternative: the changing of the flat tire with the spare tire carried in the trunk or some other position in the motor vehicle.

Many individuals are not experienced with the changing of a spare tire and have no idea where the lift points are for the proper placement of the motor vehicle jack so as to allow the car to be safely lifted in order to complete the tire change.

This document relates to a new and improved motor vehicle jack positioning system that clearly indicates where the jack point is for proper placement of the jack when attempting to change any tire of the motor vehicle.

SUMMARY

In accordance with the purposes and benefits described herein, a motor vehicle jack positioning system is provided. That motor vehicle jack positioning system comprises a light source located adjacent a jack point for the motor vehicle and a controller configured to activate the light source in response to a data signal representative of a triggering event. That triggering event may be the detection of a flat tire on the motor vehicle. That triggering event may be the removal of a spare tire from the spare tire storage point of the motor vehicle. Further, that triggering event may be manipulation of an actuator by the operator of the motor vehicle.

The motor vehicle jack positioning system may also include a cover for the light source. That cover may be displaceable between a closed position protecting the light source and an opened position allowing passage of light from the light source to indicate the position of a jack point of the motor vehicle. The controller may be configured to open the cover in response to the data signal representative of the triggering event.

In accordance with an additional aspect, a motor vehicle jack positioning system comprises: (a) a first light source located adjacent a first jack point, (b) a second light source located adjacent a second jack point, (c) a third light source located adjacent a third jack point, (d) a fourth light source located adjacent a fourth jack point and (e) a controller. That controller is configured to activate one light source of the first light source, second light source, third light source and fourth light source in response to a data signal representative of a triggering event.

The first light source and the first jack point are associated with a first tire of the motor vehicle. The second light source and the second jack point are associated with a second tire of the motor vehicle. The third light source and the third jack point are associated with a third tire of the motor vehicle. The fourth light source and the fourth jack point are associated with a fourth tire of the motor vehicle.

The motor vehicle jack positioning system may further include a tire pressure monitoring system for monitoring tire pressure of the first tire, second tire, third tire and fourth tire. Further, the controller may be configured to activate the first light source when the first tire goes flat, the second light source when the second tire goes flat, the third light source when the third tire goes flat and the fourth light source when the fourth tire goes flat.

In accordance with yet an additional aspect, a method is provided for positioning a motor vehicle jack with respect to a motor vehicle. That method comprises the steps of: (a) locating a light source adjacent a jack point of the motor vehicle, (b) configuring a controller to activate the light source in response to a data signal representative of a triggering event and (c) activating the light source following the triggering event.

The method may further include the step of detecting, by a detecting device, a flat tire where a flat tire is the triggering event. The method may also include the step of uncovering, by the controller, the light source in response to the data signal representative of the triggering event.

Further, the method may include the step of detecting, by a detecting device, removal of a spare tire from a spare tire storage point of the motor vehicle where spare tire removal is a triggering event.

In the following description, there are shown and described several preferred embodiments of the motor vehicle jack positioning system and related method. As it should be realized, the motor vehicle jack positioning system and the related method are capable of other, different embodiments and their several details are capable of modification in various, obvious aspects all without departing from the system and method as described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle jack positioning system and together with the description serve to explain certain principles thereof. In the drawing figures.

Reference will now be made in detail to the present preferred embodiments of the motor vehicle jack positioning system, examples of which are illustrated in the accompanying drawing figures.

DETAILED DESCRIPTION

Figure 1:
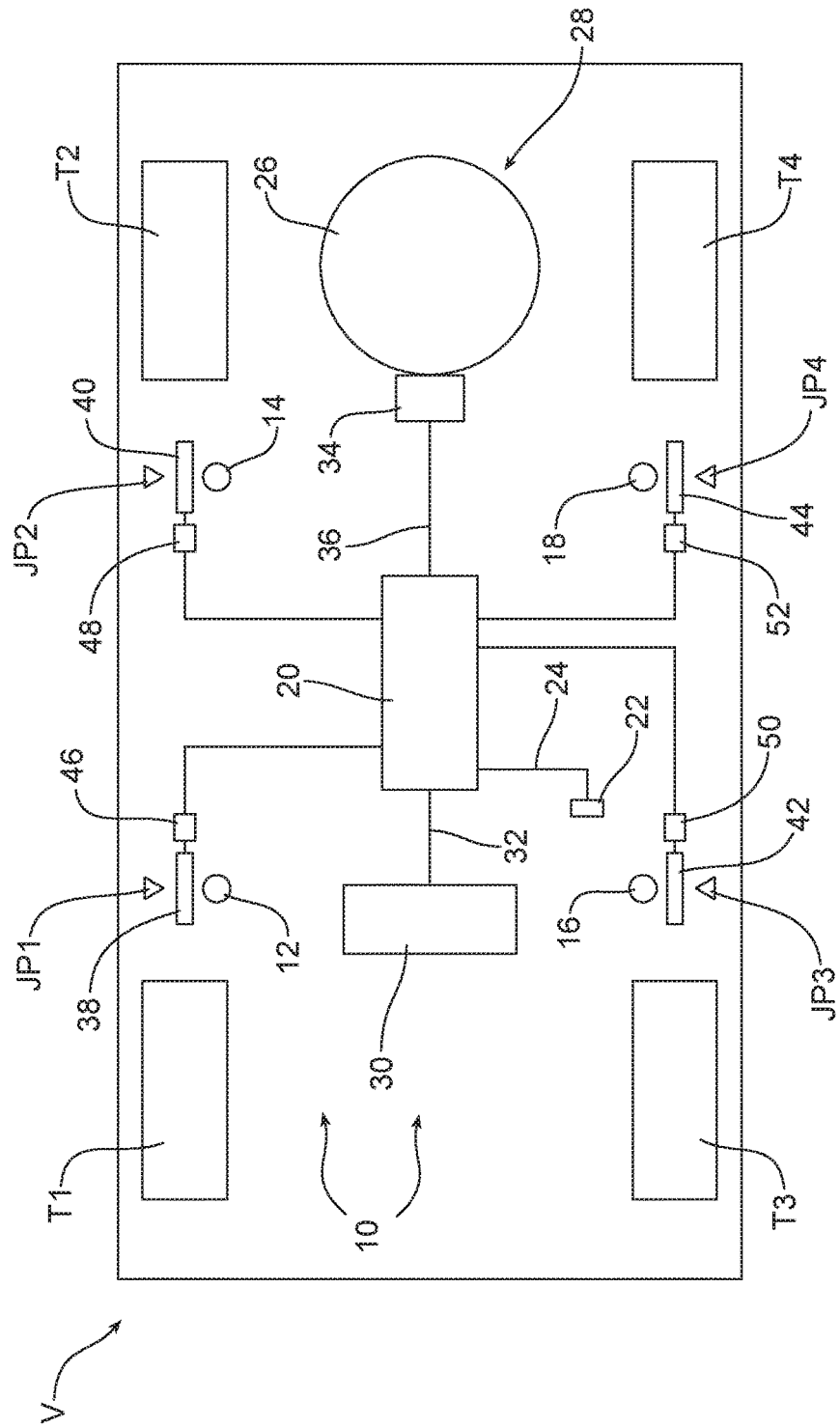
FIG. 1 is a schematic block diagram of the motor vehicle jack positioning system.

Reference is now made to FIG. 1 illustrating a "smart" motor vehicle jack positioning system 10 specially adapted for aiding an individual to properly and safely position a motor vehicle jack with respect to a motor vehicle V. The motor vehicle jack positioning system 10 includes a first light source 12 provided adjacent a first jack point JP1 of the motor vehicle V, a second light source 14 adjacent the second jack point JP2 of the motor vehicle, a third light source 16 adjacent the third jack point JP3 of the motor vehicle and a fourth light source 18 adjacent the fourth jack point JP4 of the motor vehicle.

As should be appreciated, the first light source 12 and the first jack point JP1 are associated with a first tire T1 of the motor vehicle V. More specifically, the first jack point JP1 should be used to safely lift the motor vehicle V when changing the first tire T1.

Similarly, the second light source 14 and second jack point JP2 are associated with the second tire T2 of the motor vehicle V. This second jack point JP2 is utilized to safely lift the motor vehicle V when changing the second tire T2.

The third light source 16 and third jack point JP3 are associated with the third tire T3. The third jack point JP3 is utilized to safely lift the motor vehicle V when changing the third tire T3.

The fourth light source 18 and fourth jack point JP4 are associated with the fourth tire T4. The fourth jack point JP4 is utilized to safely lift the motor vehicle V when changing the fourth tire T4.

The motor vehicle jack positioning system 10 also includes a controller 20. Controller 20 may comprise a computing device such as a dedicated microprocessor or electronic control unit (ECU) running in accordance with instructions received from appropriate control software. Thus controller 20 may comprise one or more processors, one or more memories and one or more network interfaces all communicating with each other over a communication bus.

The controller 20 is configured to activate any one light source of the first light source 12, second light source 14, third light source 16 and fourth light source 18 in response to a data signal representative of a triggering event. A triggering event may be any event or occurrence related to the need to change one or more of the first tire T1, second tire T2, third tire T3 and fourth tire T4 of the motor vehicle V. Thus, the triggering event may be selected from a group including, but not necessarily limited to, (1) activation of an actuator 22 connected to the controller 20 by means of the control line 24, (2) detection of a flat tire and (3) removal of a spare tire 26 from a spare tire storage point 28 of the motor vehicle V. The tire pressure of the first tire T1, second tire T2, third tire T3 and fourth tire T4 may be monitored by means of a tire pressure monitoring system 30. Such a system is described in U.S. Pat. No. 9,205,710 (Ford Global Technologies, LLC), the full disclosure of which is incorporated herein by reference. Such a tire pressure monitoring system 30 may be connected to the controller 20 by means of the data line 32.

A sensor 34 may be provided to monitor the spare tire storage point 28, and more particularly, the presence of a spare tire 26 at the spare tire storage point. Sensor 34 may comprise substantially any appropriate sensor for this intended purpose including, but not necessarily limited to a presence sensor, a weight sensor or the like. In the illustrated embodiment, the sensor 34 is connected to the controller 20 by means of the data line 36.

As should be apparent from the preceding and the following description, the controller 20 may be configured to activate the first light source 12 when the first tire T1 goes flat, the second light source 14 when the second tire T2 goes flat, the third light source 16 when the third tire T3 goes flat and the fourth light source 18 when the fourth tire T4 goes flat. Alternatively, or in addition, the controller 20 may be configured to activate one or more of the first light source 12, second light source 14, third light source 16 and fourth light source 18 when the spare tire 26 is removed from the spare tire storage point 28. Further, the controller 20 may be configured to activate one or more of the first light source 12, second light source 14, third light source 16 and fourth light source 18 when the actuator 22 is manipulated by the motor vehicle operator or other individual in order to activate a particular light source or all of the light sources 12, 14, 16, 18 of the motor vehicle jack positioning system 10.

As should be appreciated, the first light source 12 adjacent the first jack point JP1, the second light source 14 adjacent the second jack point JP2, the third light source 16 adjacent the third jack point JP3 and the fourth light source 18 adjacent the fourth jack point JP4 are all located on the underside of the motor vehicle where they are subjected to moisture, dirt and road grime as well as potential impact from road debris such as gravel or the like. Thus, protective covers may be a desirable feature.

In the illustrated embodiment, a first cover 38 is provided to protect the first light source 12. A second cover 40 is provided to protect the second light source 14. A third cover 42 is provided to protect the third light source 16. A fourth cover 44 is provided to protect the fourth light source 18. The covers may be made of an impact resistant clear material fixed to the underbody of the motor vehicle V. In the illustrated embodiment, the covers are each displaceable between a closed position and an open position. Thus, the covers 38, 40, 42 and 44 may be opaque if desired.

Figure 2A:
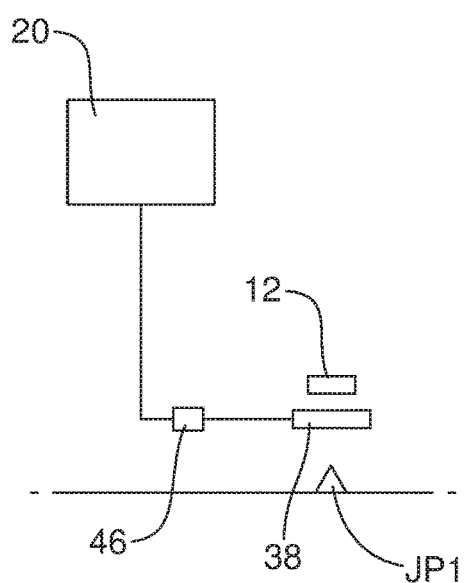
FIGS. 2a and 2b are detailed schematic views illustrating operation of the cover utilized to protect the light source adjacent the jack point.
Figure 2B:
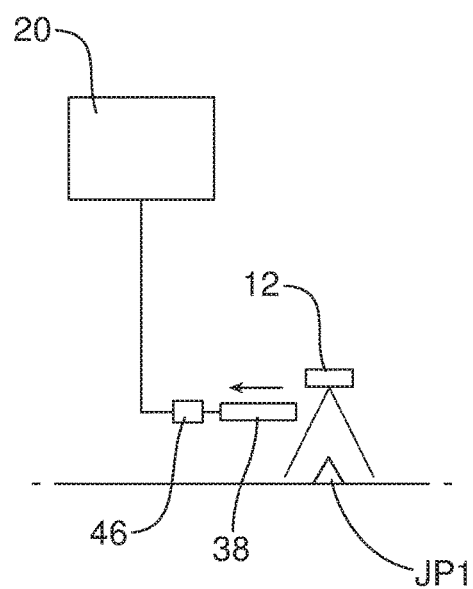

As illustrated in FIG. 2a, when the cover 38 is in a closed position it underlies and protects the first light source 12 from road dirt and grime, inclement weather conditions and road debris impact damage. As illustrated in FIG. 2b, when the cover 38 is opened, a clear passageway is provided so that light emitted by the first light source 12 shines upon the first jack point JP1 clearly identifying the proper point for the positioning of a motor vehicle jack when one wishes to change the first tire T1.

While not illustrated, the second cover 40 for the second light source 14, the third cover 42 for the third light source 16 and the fourth cover 44 for the fourth light source 18 operates in the same manner. Thus as illustrated in FIG. 1, it should be appreciated that the first cover 38 is displaced between the open and closed positions by a first actuator 46. The second cover 40 is displaced between the closed and opened positions by means of the second actuator 48. The third cover 42 is displaced between the opened and closed positions by the third actuator 50. The fourth cover 44 is displaced between the opened and closed positions by the fourth actuator 52. As shown, all of the actuators 46, 48, 50, 52 are controlled by the controller 20.

Consistent with the above description, a method is provided of positioning a motor vehicle jack with respect to a motor vehicle V. That method comprises the steps of: (a) locating a light source 12, 14, 16, and 18 adjacent a jack point JP1, JP2, JP3, JP4 of the motor vehicle, (b) configuring a controller 20 to activate a light source 12, 14, 16 or 18 in response to a data signal representative of a triggering event and (c) activating that light source 12, 14, 16 or 18 following the triggering event.

As noted above, the method may include detecting, by a detecting device such as the tire pressure monitoring system 30, a flat tire T1, T2, T3 or T4 when a flat tire is the triggering event of interest.

Alternatively, the method may include the step of detecting, by the detecting device or sensor 34, removal of the spare tire 26 from the spare tire storage point 28 of the motor vehicle V where spare tire removal is the triggering event.

Still further, the method may include the step of uncovering, by the controller 20 (through activation and operation of the first actuator 46, second actuator 48, third actuator 50 or fourth actuator 52 connected, respectively, to the first cover 38, second cover 40, third cover 42 and fourth cover 44), the light source 12, 14, 16 or 18 in response to a data signal representative of the triggering event of interest. Thus, it should be appreciated that the controller 20 uncovers the light source 12, 14, 16 or 18 by opening the associated cover 38, 40, 42 or 44 through operation of the associated actuator 46, 48, 50 or 52 and activates the uncovered light source 12, 14, 16 or 18 in response to the triggering event. As should be appreciated, the activated light source 12, 14, 16 or 18 illuminates the jack point JP1, JP2, JP3 or JP4 associated with the flat tire T1, T2, T3 or T4 thereby indicating the point for proper placement of the motor vehicle jack. Thus, the motor vehicle jack positioning system 10 eliminates the guesswork for an individual when using the motor vehicle jack to change a flat tire, enhancing user safety in a very user-friendly manner. Accordingly, it should be appreciated that the motor vehicle jack positioning system 10 represents a significant advance in the motor vehicle art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A motor vehicle jack positioning system for a motor vehicle, comprising:
   a light source located adjacent a jack point for said motor vehicle; and
   a controller configured to activate said light source in response to a data signal representative of a triggering event.

2. The motor vehicle jack positioning system of claim 1, wherein said triggering event is detection of a flat tire.

3. The motor vehicle jack positioning system of claim 2, including a cover for said light source, said cover being displaceable between a closed position protecting said light source and an opened position allowing passage of light from said light source.

4. The motor vehicle jack positioning system of claim 3, wherein said controller is configured to open said cover in response to said data signal representative of said triggering event.

5. The motor vehicle jack positioning system of claim 1, wherein said triggering event is removal of a spare tire from a spare tire storage point of said motor vehicle.

6. The motor vehicle jack positioning system of claim 5, including a cover for said light source, said cover being displaceable between a closed position protecting said light source and an opened position allowing passage of light from said light source.

7. The motor vehicle jack positioning system of claim 6, wherein said controller is configured to open said cover in response to said data signal representative of said triggering event.

8. A motor vehicle jack positioning system for a motor vehicle, comprising:
   a first light source located adjacent a first jack point;
   a second light source located adjacent a second jack point;
   a third light source located adjacent a third jack point;
   a fourth light source located adjacent a fourth jack point; and
   a controller configured to activate only said first light source when said first tire goes flat, only said second light source when said second tire goes flat, only said third light source when said third tire goes flat and only said fourth light source when said fourth tire goes flat.

9. The motor vehicle jack positioning system of claim 8, wherein said first light source and said first jack point are associated with a first tire on said motor vehicle, said second light source and said second jack point are associated with a second tire on said motor vehicle, said third light source and said third jack point are associated with a third tire on said motor vehicle and said fourth light source and said fourth jack point are associated with a fourth tire on said motor vehicle.

10. The motor vehicle jack positioning system of claim 9, further including a tire pressure monitoring system for monitoring tire pressures of said first tire, said second tire, said third tire and said fourth tire.

11. A method of positioning a motor vehicle jack with respect to a motor vehicle, comprising:
    locating a light source adjacent a jack point of said motor vehicle;
    configuring a controller to activate said light source in response to a data signal representative of a triggering event;
    detecting, by detecting device, a flat tire where said flat tire is said triggering event;
    uncovering, by said controller, said light source in response to said data signal representative of said triggering event; and
    activating, by said controller, said light source following said triggering event.

12. The method of claim 11, including detecting, by detecting device, removal of a spare tire from a spare tire storage point of the motor vehicle where spare tire removal is said triggering event.

13. The method of claim 12, including uncovering, by said controller, said light source in response to said data signal representative of said triggering event.

* * * * *